US012665433B2

(12) United States Patent
Bian

(10) Patent No.: US 12,665,433 B2
(45) Date of Patent: Jun. 23, 2026

(54) COLLABORATIVE CHARGING METHOD AND APPARATUS, AND LOGISTICS DEVICES

(71) Applicant: BEIJING JINGDONG QIANSHI TECHNOLOGY CO., LTD., Beijing (CN)

(72) Inventor: Xuepeng Bian, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 917 days.

(21) Appl. No.: 17/918,033

(22) PCT Filed: Apr. 1, 2021

(86) PCT No.: PCT/CN2021/084877
§ 371 (c)(1),
(2) Date: Oct. 10, 2022

(87) PCT Pub. No.: WO2021/204052
PCT Pub. Date: Oct. 14, 2021

(65) Prior Publication Data
US 2023/0130011 A1 Apr. 27, 2023

(30) Foreign Application Priority Data
Apr. 10, 2020 (CN) .......................... 202010279540.3

(51) Int. Cl.
*H02J 7/14* (2006.01)
*G06Q 10/083* (2023.01)
(Continued)

(52) U.S. Cl.
CPC .......... *H02J 7/1446* (2013.01); *G06Q 10/083* (2013.01); *H02J 7/82* (2026.01); *H02J 50/10* (2016.02)

(58) Field of Classification Search
CPC .................................................... H02J 7/1446
See application file for complete search history.

(56) References Cited

U.S. PATENT DOCUMENTS 8,106,627 B1 1/2012 Rossi
2019/0001833 A1 1/2019 Coburn et al.
2019/0197798 A1* 6/2019 Abari ..................... G06Q 10/02

FOREIGN PATENT DOCUMENTS

CN 103512580 A 1/2014
CN 106503836 A 3/2017
(Continued)

OTHER PUBLICATIONS

Chinese Patent Office Action for Application No. 2020102795403 dated Apr. 26, 2021 (17 pages, including an English translation).
(Continued)

*Primary Examiner* — Robert Grant
(74) *Attorney, Agent, or Firm* — Michael Best & Friedrich LLP

(57) ABSTRACT

Disclosed are a collaborative charging method, apparatus, and logistics device, which relate to the technical field of logistics. One specific implementation mode of the method comprises: judging whether remaining battery power of a first logistics device satisfies a preset charging condition; if so, determining a target second logistics device for charging the first logistics device; and controlling the target second logistics device to move to meet the first logistics device so as to charge the first logistics device. According to the implementation mode, collaborative charging between respective logistics devices can avoid problems such as low charging efficiency and energy waste caused by necessity of returning to a charging station for charging.

12 Claims, 3 Drawing Sheets

(51) Int. Cl.
  *H02J 7/82*       (2026.01)
  *H02J 50/10*     (2016.01)

(56)             References Cited

FOREIGN PATENT DOCUMENTS

| | | | |
|---|---|---|---|
| CN | 106956600 | A | 7/2017 |
| CN | 107038547 | A | 8/2017 |
| CN | 107103391 | A | 8/2017 |
| CN | 107351694 | A | 11/2017 |
| CN | 107958314 | A | 4/2018 |
| CN | 109141398 | A | 1/2019 |
| CN | 109774521 | A | 5/2019 |
| CN | 110612548 | A | 12/2019 |
| CN | 110635530 | A | 12/2019 |
| CN | 110782148 | A | 2/2020 |
| CN | 110962668 | A | 4/2020 |
| CN | 111463860 | A | 7/2020 |

OTHER PUBLICATIONS

International Search Report and Written Opinion for Application No. PCT/CN2021/084877 dated Oct. 14, 2021 (14 pages, including an English translation).
European Patent Office Extended Search Report and Written Opinion for Application No. 21784028.9 dated May 23, 2024 (10 pages).

\* cited by examiner

COLLABORATIVE CHARGING METHOD AND APPARATUS, AND LOGISTICS DEVICES

CROSS-REFERENCE TO RELATED APPLICATION(S)

This is a U.S. national stage entry of International Patent Application No. PCT/CN2021/084877, filed on Apr. 1, 2021, which claims priority to Chinese Patent Application No. 202010279540.3, filed on Apr. 10, 2020, the entire contents of each of which are fully incorporated herein by reference.

TECHNICAL FIELD

The disclosure relates to the technical field of logistics, and in particular relates to a collaborative charging method, apparatus, and logistics device.

BACKGROUND

In the existing art, a logistics device used for logistics delivery generally uses a DC power supply as an energy source. When battery power is low, the logistics device is required to return to a charging station for charging. Such charging method has low charging efficiency and is prone to cause energy waste.

SUMMARY

In view of this, the embodiment of the disclosure provides a collaborative charging method, apparatus, and logistics device, which can avoid problems such as low charging efficiency and energy waste caused by necessity of returning to a charging station for charging.

In order to achieve the aforesaid object, according to one aspect of the embodiment of the disclosure, a collaborative charging method is provided, the method comprising:

judging whether remaining battery power of a first logistics device satisfies a preset charging condition;

if so, determining a target second logistics device for charging the first logistics device; and controlling the target second logistics device to move to meet the first logistics device so as to charge the first logistics device.

Optionally, the preset charging condition comprises: the remaining battery power of the first logistics device being less than battery power required by the first logistics device to arrive at a charging station; or a time difference between a delivery time and a scheduled delivery time of a next delivery site being less than or equal to a time difference threshold, the delivery time referring to a time when the first logistics device arrives at the next delivery site after it arrives at the charging station for charging and after it is fully charged.

Optionally, determining a target second logistics device for charging the first logistics device comprises:

determining a waiting time required by each second logistics device in a plurality of candidate second logistics devices to meet the first logistics device and a charging time required thereby for charging the first logistics device;

determining, in accordance with the waiting time and charging time corresponding to each candidate second logistics device, a total charging time corresponding to the candidate second logistics device; and using the candidate second logistics device with the shortest total charging time as the target second logistics device for charging the first logistics device.

Optionally, before determining a waiting time required by each second logistics device in a plurality of candidate second logistics devices to meet the first logistics device and a charging time required thereby for charging the first logistics device, the method further comprises: selecting, in accordance with a parking position and an arrival time to the parking position of the first logistics device, the second logistics devices whose distances from the parking position at the arrival time are less than or equal to a distance threshold from all the second logistics devices as the candidate second logistics devices; and controlling the target second logistics device to move to meet the first logistics device comprises: controlling the target second logistics device to move to the parking position so as to meet the first logistics device.

Optionally, before controlling the target second logistics device to move to the parking position so as to meet the first logistics device, the method further comprises:

planning a path for the target second logistics device in accordance with the parking position to determine a path trajectory; and controlling the target second logistics device to move to the parking position so as to meet the first logistics device comprises: controlling the target second logistics device to move to the parking position along the path trajectory so as to meet the first logistics device.

Optionally, before judging whether remaining battery power of a first logistics device satisfies a preset charging condition, the method further comprises: confirming receipt of a charging request from the first logistics device;

wherein the charging request is transmitted when a battery life of the first logistics device is less than a remaining driving time duration of the first logistics device; the remaining driving time duration of the first logistics device refers to a time duration required by the first logistics device to arrive at a next delivery site.

Optionally, contactless charging is adopted between the first logistics device and the target second logistics device.

Optionally, the first logistics device and/or the target second logistics device is: an unmanned vehicle or drone for logistics delivery.

According to a second aspect of the embodiment of the disclosure, a collaborative charging apparatus is provided, the apparatus comprising:

a judging module for judging whether remaining battery power of a first logistics device satisfies a preset charging condition;

a determining module for determining a target second logistics device for charging the first logistics device when the remaining battery power of the first logistics device satisfies the preset charging condition; and a charging module for controlling the target second logistics device to move to meet the first logistics device so as to charge the first logistics device.

Optionally, the preset charging condition comprises: the remaining battery power of the first logistics device being less than battery power required by the first logistics device to arrive at a charging station; or a time difference between a delivery time and a scheduled delivery time of a next delivery site being less than or equal to a time difference threshold, the delivery time referring to a time when the first logistics device arrives at the next delivery site after it arrives at the charging station for charging and after it is fully charged.

Optionally, the determining module determining a target second logistics device for charging the first logistics device comprises:

determining a waiting time required by each second logistics device in a plurality of candidate second logistics devices to meet the first logistics device and a charging time required thereby for charging the first logistics device;

determining, in accordance with the waiting time and charging time corresponding to each candidate second logistics device, a total charging time corresponding to the candidate second logistics device; and using the candidate second logistics device with the shortest total charging time as the target second logistics device for charging the first logistics device.

Optionally, the determining module is further used for: before determining a waiting time required by each second logistics device in a plurality of candidate second logistics devices to meet the first logistics device and a charging time required thereby for charging the first logistics device, selecting, in accordance with a parking position and an arrival time to the parking position of the first logistics device, the second logistics devices whose distances from the parking position at the arrival time are less than or equal to a distance threshold from all the second logistics devices as the candidate second logistics devices; and the charging module controlling the target second logistics device to move to meet the first logistics device comprises: controlling the target second logistics device to move to the parking position so as to meet the first logistics device.

Optionally, the charging module is further used for: before controlling the target second logistics device to move to the parking position so as to meet the first logistics device, planning a path for the target second logistics device in accordance with the parking position to determine a path trajectory; and the charging module controlling the target second logistics device to move to the parking position so as to meet the first logistics device comprises: controlling the target second logistics device to move to the parking position along the path trajectory so as to meet the first logistics device.

Optionally, the judging module is further used for: before judging whether remaining battery power of a first logistics device satisfies a preset charging condition, confirming receipt of a charging request from the first logistics device;

wherein the charging request is made when a battery life of the first logistics device is less than a remaining driving time duration of the first logistics device; the remaining driving time duration of the first logistics device refers to a time duration required by the first logistics device to arrive at a next delivery site.

Optionally, contactless charging is adopted between the first logistics device and the target second logistics device.

Optionally, the first logistics device and/or the target second logistics device is: an unmanned vehicle or drone for logistics delivery.

According to a third aspect of the embodiment of the disclosure, a collaborative charging logistics device is provided, the logistics device comprising:

a task execution body for executing a logistics delivery task and moving to meet a logistics device to be charged to charge the logistics device to be charged when receiving a control command of a collaborative charging apparatus;

a detecting module for judging whether a battery life of the task execution body is less than a remaining driving time duration of the task execution body; the remaining driving time duration of the task execution body referring to a time duration required by the task execution body to arrive at a next delivery site; and an alarming module for transmitting a charging request when the battery life of the task execution body is less than the remaining driving time duration of the task execution body, so that the collaborative charging apparatus judges whether the remaining battery power of the task execution body satisfies a preset charging condition after receiving the charging request, and determining a target second logistics device for charging the task execution body when judging that the remaining battery power of the task execution body satisfies the preset charging condition and controlling the target second logistics device to move to meet the task execution body so as to charge the task execution body.

Optionally, the preset charging condition comprises: the remaining battery power of the task execution body is less than battery power required by the task execution body to arrive at a charging station; or a time difference between a delivery time and a scheduled delivery time of a next delivery site is less than or equal to a time difference threshold, the delivery time referring to a time when the task execution body arrives at the next delivery site after it arrives at the charging station for charging and after it is fully charged.

Optionally, the target second logistics device is determined by the following steps:

determining a waiting time required by each second logistics device in a plurality of candidate second logistics devices to meet the task execution body and a charging time required thereby for charging the task execution body;

determining, in accordance with the waiting time and charging time corresponding to each candidate second logistics device, a total charging time corresponding to the candidate second logistics device; and using the candidate second logistics device with the shortest total charging time as the target second logistics device for charging the task execution body.

Optionally, the candidate second logistics devices are determined by the following step: selecting, in accordance with a parking position and an arrival time to the parking position of the task execution body, the second logistics devices whose distances from the parking position at the arrival time are less than or equal to a distance threshold from all the second logistics devices as the candidate second logistics devices; and the collaborative charging apparatus controls the target second logistics device to move to the parking position so as to meet the task execution body.

Optionally, the collaborative charging apparatus, before controlling the target second logistics device to move to the parking position so as to meet the task execution body after receiving the charging request, plans a path for the target second logistics device in accordance with the parking position to determine a path trajectory; and the collaborative charging apparatus controls the target second logistics device to move to the parking position along the path trajectory so as to meet the task execution body.

Optionally, contactless charging is adopted between the task execution body and the target second logistics device.

Optionally, the first logistics device and/or the target second logistics device is: an unmanned vehicle or drone for logistics delivery.

According to a fourth aspect of the embodiment of the disclosure, a collaborative charging electronic device is provided, the electronic device comprising:

one or more processors;

a memory for storing one or more programs, the one or more programs, when executed by the one or more processors, causing the one or more processors to implement the method provided by the first aspect of the embodiment of the disclosure.

According to a fifth aspect of the embodiment of the disclosure, a computer-readable medium, on which a computer program is stored, is provided, wherein the program, when executed by a processor, implements the method provided by the first aspect of the embodiment of the disclosure.

The embodiment of the disclosure has the following advantages or beneficial effects: collaborative charging between respective logistics devices can avoid problems such as low charging efficiency and energy waste caused by necessity of returning to a charging station for charging.

Further effects of the aforesaid non-conventional optional manners will be described below in combination with specific implementation modes.

BRIEF DESCRIPTION OF THE DRAWINGS

Figures are used to better understand the disclosure, and do not form improper limitations of the disclosure. Where.

DETAILED DESCRIPTION OF EMBODIMENTS

The exemplary embodiments of the disclosure, including various details of the embodiments of the disclosure, are described below in combination with the figures to facilitate understanding, and shall be considered to be exemplary ones only. Thus, those skilled in the art should recognize that various changes and modifications may be made to the embodiments described herein without departing from the scope and spirit of the disclosure. Similarly, for clarity and conciseness, descriptions of well-known functions and structures are omitted in the descriptions below.

According to one aspect of the embodiment of the disclosure, a collaborative charging method is provided.

Figure 1:
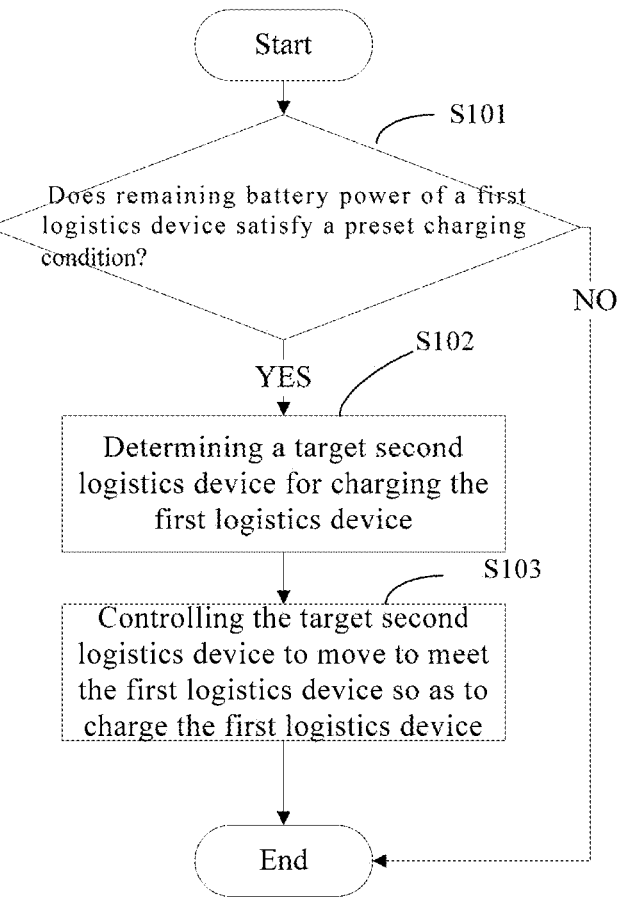
FIG. 1 is a schematic diagram of a main flow of a collaborative charging method according to an embodiment of the disclosure.

FIG. 1 is a schematic diagram of a main flow of a collaborative charging method according to an embodiment of the disclosure. As shown in FIG. 1, the collaborative charging method comprises: step S101, step S102 and step S103.

In step S101, it is judged whether remaining battery power of a first logistics device satisfies a preset charging condition. If so, step S102 is jumped to; otherwise, the process ends.

The first logistics device refers to a logistics device for executing a logistics delivery task. The logistics device may be an unmanned vehicle or drone for logistics delivery, or a manned train or plane and so on.

The preset charging condition refers to a condition that a logistics device required to be charged should satisfy. The specific content of the preset charging condition may be selectively set according to actual circumstances.

In some embodiments, the preset charging condition comprises: the remaining battery power of the first logistics device being less than battery power required by the first logistics device to arrive at a charging station. When the number of charging stations is more than one, the charging station mentioned in the preset charging condition herein refers to the charging station with the smallest distance from the first logistics device. In this way, when it is determined that the remaining battery power of the first logistics device is insufficient to arrive at the charging station for charging, other logistics devices can be used to charge the first logistics device in time.

In some other embodiments, the preset charging condition comprises: a time difference between a delivery time and a scheduled delivery time of a next delivery site being less than or equal to a time difference threshold. The delivery time in this example refers to a time when the first logistics device arrives at the next delivery site after it arrives at the charging station for charging and after it is fully charged. The next delivery site refers to a delivery site that the first logistics device should arrive at next. When the number of charging stations is more than one, the charging station mentioned in the preset charging condition herein refers to the charging station with the smallest distance from the first logistics device.

The specific value of the time difference threshold may be selectively setup according to actual circumstances. When the time difference threshold is a positive value, it indicates that the time when the first logistics device actually arrives at the next delivery site may be later than the scheduled delivery time of the next delivery site, i.e., delivery may be delayed. When the time difference threshold is a negative value, it indicates that the time when the first logistics device actually arrives at the next delivery site should be earlier than the scheduled delivery time of the next delivery site, i.e., delivery should be performed in advance. When the time difference threshold is zero, it indicates that the time when the first logistics device actually arrives at the next delivery site may not be later than the scheduled delivery time of the next delivery site, i.e., delivery may be performed on time or in advance, and may not be delayed.

Using other logistics devices to charge the first logistics device when the time difference between the delivery time and the scheduled delivery time of the next delivery site is less than or equal to the time difference threshold can avoid the occurrence of the circumstance where the delivery time is comparatively late caused by the first logistics device arriving at the charging station for charging by itself and then performing delivery.

In the embodiment of the disclosure, it is possible to judge whether the remaining battery power of each logistics device satisfies the preset charging condition by monitoring the remaining battery power of each logistics device in time.

In the embodiment of the disclosure, it is also possible to judge whether the remaining battery power of the first logistics device satisfies the preset charging condition after receiving a charging request transmitted by the first logistics device. Further, the charging request is transmitted when a battery life of the first logistics device is less than a remaining driving time duration of the first logistics device. The remaining driving time duration of the first logistics device refers to a time duration required by the first logistics device to arrive at a next delivery site. The battery life mentioned herein refers to the maximum time duration, during which the logistics device can work with the remaining battery power of the logistics device. By judging whether the remaining battery power of the first logistics device satisfies the preset charging condition after receiving the charging request transmitted by the first logistics device, the calculation amount of the collaborative charging method in the embodiment of the disclosure can be greatly simplified, and the processing speed of the method can be improved. Making the logistics device transmit a charging request when the battery life is less than the remaining driving time duration can charge the logistics device in time when the battery power of the logistics device is low.

In step S102, a target second logistics device for charging the first logistics device is determined. In step S103, the target second logistics device is controlled to move to meet the first logistics device so as to charge the first logistics device.

The first logistics device and a second logistics device both refer to logistics devices for executing a logistics delivery task. The words "first" and "second" are used for distinguishing different logistics devices. The logistics device may be an unmanned vehicle or drone for logistics delivery, or a manned train or plane and so on.

The manner for determining the target second logistics device for charging the first logistics device may be selectively setup according to actual circumstances. For example, one second logistics device is randomly selected from the respective second logistics devices to serve as the target second logistics device, or the second logistics device with the most remaining battery power is selected from the respective second logistics devices to serve as the target second logistics device, or one second logistics device in idle state is selected from the respective second logistics devices to serve as the target second logistics device.

Optionally, determining the target second logistics device for charging the first logistics device comprises: determining a waiting time required by each second logistics device in a plurality of candidate second logistics devices to meet the first logistics device and a charging time required thereby for charging the first logistics device; determining, in accordance with the waiting time and charging time corresponding to each candidate second logistics device, a total charging time corresponding to the candidate second logistics device; and using the candidate second logistics device with the shortest total charging time as the target second logistics device for charging the first logistics device. Using the candidate second logistics device with the shortest total charging time as the target second logistics device can increase the charging speed of the first logistics device, so that the first logistics device enters the working state as soon as possible after it is fully charged so as to avoid impacts on subsequent delivery tasks due to charging.

The manner for determining the candidate second logistics devices may be selectively setup according to actual circumstances. For example, one or more second logistics devices are randomly selected from the respective second logistics devices to serve as the candidate second logistics devices, or a plurality of second logistics devices with more remaining battery power are selected from the respective second logistics devices to serve as the candidate second logistics devices, or a plurality of second logistics devices in idle state are selected from the respective second logistics devices to serve as the candidate second logistics device.

Optionally, the candidate second logistics devices are determined by the following step: selecting, in accordance with a parking position and an arrival time to the parking position of the first logistics device, the second logistics devices whose distances from the parking position at the arrival time are less than or equal to a distance threshold from all the second logistics devices as the candidate second logistics devices. The parking position, or the parking position and arrival time mentioned herein may be generated by the first logistics device, or may be obtained by calculation after acquiring relevant information of the first logistics device. In the embodiment, controlling the target second logistics device to move to meet the first logistics device comprises: controlling the target second logistics device to move to the parking position so as to meet the first logistics device.

Selecting the candidate second logistics devices in accordance with the parking position and arrival time can improve availability of the selected candidate second logistics devices.

After determining the target second logistics device, the second logistics device may determines a path trajectory to meet the first logistics device by itself. Optionally, before controlling the target second logistics device to move to the parking position so as to meet the first logistics device, the method further comprises: planning a path for the target second logistics device in accordance with the parking position to determine a path trajectory. Controlling the target second logistics device to move to the parking position so as to meet the first logistics device comprises: controlling the target second logistics device to move to the parking position along the path trajectory so as to meet the first logistics device.

The manner for determining the path trajectory may be selectively set according to actual circumstances. Determining the path trajectory of the target second logistics device facilitates management of movement trajectories of the respective logistics devices and knowing of real-time positions of the respective logistics devices.

The charging manner between the first logistics device and the second logistics device may be selectively setup according to actual circumstances. For example, contactless charging (e.g., electromagnetic induction charging) is adopted or contact charging (e.g., charging with a charging plug) is adopted.

The collaborative charging method according to the embodiment of the disclosure is exemplarily described below by taking it as an example that the first logistics device is an unmanned vehicle for logistics delivery. When the unmanned vehicle actually delivers goods, there will be a time window period waiting for users to pick up the goods, during which period the vehicle is in a stationary state, and if the vehicle has sufficient battery power, it may deliver battery power to other surrounding logistics devices with low battery power. On the contrary, if the other surrounding logistics devices have sufficient battery power but the unmanned vehicle has low battery power, the other surrounding logistics devices may be used to charge the unmanned vehicle.

In a normal delivery process, the unmanned vehicle checks at a certain frequency whether its remaining battery power is sufficient to support the unmanned vehicle/drone to arrive at the next site smoothly to complete the delivery task. The specific checking method is to estimate the battery life t1 at the current power consumption speed and the time duration t2 required by the unmanned vehicle to arrive at the next delivery site, and if a value of t1 is less than a value of t2, a low battery power warning mechanism is triggered to make a charging request to the cloud (cloud network). The charging request includes the parking position and the arrival time to the parking position of the unmanned vehicle.

After receiving the charging request, the cloud makes the following decisions:

In the first step, it is judged whether the remaining battery power of the unmanned vehicle is sufficient to support it to return to a nearby charging station by itself, i.e., it is judged whether the remaining battery power of the unmanned vehicle is greater than or equal to the battery power required by the unmanned vehicle to arrive at the charging station. If the battery power is sufficient for the unmanned vehicle to return to the charging station, it is further judged whether a serious delay in the delivery of the goods will be caused (the serious delay may be defined as performing the delivery later than the scheduled time by a certain time), i.e., it is judged whether the time difference between the delivery time and the scheduled delivery time of the next delivery site is less than or equal to the time difference threshold. If the remaining battery power of the unmanned vehicle is insufficient to support it to return to the nearby charging station by itself, or the turn-back charging will result in a serious delay in the delivery time, the second step is triggered, otherwise the unmanned vehicle or drone will be required to turn back directly to the nearby charging station for charging.

In the second step, the cloud acquires the parking position and arrival time of the unmanned vehicle, creates an id (identification) list of unmanned vehicles or drones with sufficient battery power that are not far from the unmanned vehicle within a certain time and space range, and plans the time and space position of each unmanned vehicle or drone in the list when it approaches the unmanned vehicle or drone with the low battery power (specific planning may use a genetic algorithm to solve a traveling salesman problem, and no unnecessary details are given herein). Since the unmanned vehicle to be charged and the unmanned vehicle or drone to be discharged for charging the unmanned vehicle to be charged generally will not arrive at the same time, the unmanned vehicle or drone that makes (waiting time+ charging time) be the shortest, and makes the unmanned vehicle or drone to be discharged have the smallest delay in its own delivery task is selected to execute the discharging task. Subsequently, the information such as the position and time, etc. where and when the unmanned vehicle to be charged meets the unmanned vehicle or drone to be discharged is transmitted to the corresponding unmanned vehicle or drone, and a movement route is planned therefor.

In the third step, when the charging and discharging unmanned vehicles or drones meet, a contactless charging manner is adopted.

In the fourth step, after the completion of charging, the charging and discharging unmanned vehicles or drones start continuing to execute corresponding logistics delivery tasks, respectively.

Insufficient battery power is a problem that has to be faced during the delivery by the logistics device. A sudden drop in electrical energy often occurs, e.g., a sudden drop in temperature in life causes the battery power to drop to 1% rapidly, or this situation cannot be predicted in advance due to the abnormal battery power consumption of the logistics device system. The collaborative charging method according to the embodiment of the disclosure can achieve timely and flexible adjustment of charging and discharging of the respective logistics devices, and collaborative charging between respective logistics devices can avoid problems such as low charging efficiency and energy waste caused by necessity of returning to a charging station for charging.

According to a second aspect of the embodiment of the disclosure, an apparatus for implementing the aforesaid method is provided.

Figure 2:
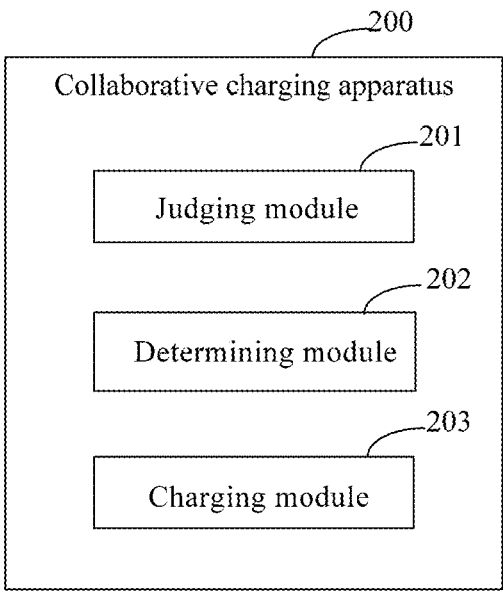
FIG. 2 is a schematic diagram of main modules of a collaborative charging apparatus according to an embodiment of the disclosure.

FIG. 2 is a schematic diagram of main modules of a collaborative charging apparatus according to an embodiment of the disclosure. As shown in FIG. 2, the collaborative charging apparatus 200 comprises:

a judging module 201 for judging whether remaining battery power of a first logistics device satisfies a preset charging condition;

a determining module 202 for determining a target second logistics device for charging the first logistics device when the remaining battery power of the first logistics device satisfies the preset charging condition; and a charging module 203 for controlling the target second logistics device to move to meet the first logistics device so as to charge the first logistics device.

Optionally, the preset charging condition comprises: the remaining battery power of the first logistics device being less than battery power required by the first logistics device to arrive at a charging station; or a time difference between a delivery time and a scheduled delivery time of a next delivery site being less than or equal to a time difference threshold, the delivery time referring to a time when the first logistics device arrives at the next delivery site after it arrives at the charging station for charging and after it is fully charged.

Optionally, the determining module determining a target second logistics device for charging the first logistics device comprises:

determining a waiting time required by each second logistics device in a plurality of candidate second logistics devices to meet the first logistics device and a charging time required thereby for charging the first logistics device;

determining, in accordance with the waiting time and charging time corresponding to each candidate second logistics device, a total charging time corresponding to the candidate second logistics device; and using the candidate second logistics device with the shortest total charging time as the target second logistics device for charging the first logistics device.

Optionally, the determining module is further used for: before determining a waiting time required by each second logistics device in a plurality of candidate second logistics devices to meet the first logistics device and a charging time required thereby for charging the first logistics device, selecting, in accordance with a parking position and an arrival time to the parking position of the first logistics device, the second logistics devices whose distances from the parking position at the arrival time are less than or equal to a distance threshold from all the second logistics devices as the candidate second logistics devices; and the charging module controlling the target second logistics device to move to meet the first logistics device comprises: controlling the target second logistics device to move to the parking position so as to meet the first logistics device.

Optionally, the charging module is further used for: before controlling the target second logistics device to move to the parking position so as to meet the first logistics device, planning a path for the target second logistics device in accordance with the parking position to determine a path trajectory; and the charging module controlling the target second logistics device to move to the parking position so as to meet the first logistics device comprises: controlling the target second logistics device to move to the parking position along the path trajectory so as to meet the first logistics device.

Optionally, the judging module is further used for: before judging whether remaining battery power of a first logistics device satisfies a preset charging condition, confirming receipt of a charging request from the first logistics device; wherein the charging request is transmitted when a battery life of the first logistics device is less than a remaining driving time duration of the first logistics device; the remaining driving time duration of the first logistics device refers to a time duration required by the first logistics device to arrive at a next delivery site.

Optionally, contactless charging is adopted between the first logistics device and the target second logistics device.

Optionally, the first logistics device and/or the target second logistics device is: an unmanned vehicle or drone for logistics delivery.

According to a third aspect of the embodiment of the disclosure, a collaborative charging logistics device is provided.

Figure 3:
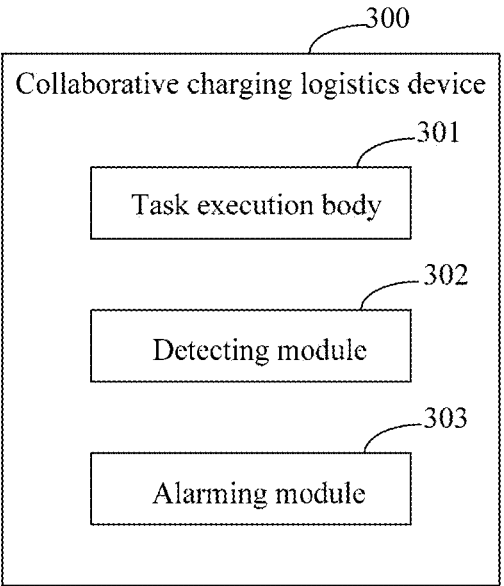
FIG. 3 is a schematic diagram of main modules of a collaborative charging logistics device according to an embodiment of the disclosure.

FIG. 3 is a schematic diagram of main modules of a collaborative charging logistics device according to an embodiment of the disclosure. As shown in FIG. 3, the collaborative charging logistics device 300 comprises:

a task execution body 301 for executing a logistics delivery task and moving to meet a logistics device to be charged to charge the logistics device to be charged when receiving a control command of a collaborative charging apparatus;

a detecting module 302 for judging whether a battery life of the task execution body is less than a remaining driving time duration of the task execution body; the remaining driving time duration of the task execution body referring to a time duration required by the task execution body to arrive at a next delivery site; and an alarming module 303 for transmitting a charging request when the battery life of the task execution body is less than the remaining driving time duration of the task execution body, so that the collaborative charging apparatus judges whether the remaining battery power of the task execution body satisfies a preset charging condition after receiving the charging request, and determining a target second logistics device for charging the task execution body when judging that the remaining battery power of the task execution body satisfies the preset charging condition and controlling the target second logistics device to move to meet the task execution body so as to charge the task execution body.

Optionally, the preset charging condition comprises: the remaining battery power of the task execution body is less than battery power required by the task execution body to arrive at a charging station; or a time difference between a delivery time and a scheduled delivery time of a next delivery site is less than or equal to a time difference threshold, the delivery time referring to a time when the task execution body arrives at the next delivery site after it arrives at the charging station for charging and after it is fully charged.

Optionally, the target second logistics device is determined by the following steps:

determining a waiting time required by each second logistics device in a plurality of candidate second logistics devices to meet the task execution body and a charging time required thereby for charging the task execution body;

determining, in accordance with the waiting time and charging time corresponding to each candidate second logistics device, a total charging time corresponding to the candidate second logistics device; and using the candidate second logistics device with the shortest total charging time as the target second logistics device for charging the task execution body.

Optionally, the candidate second logistics devices are determined by the following step: selecting, in accordance with a parking position and an arrival time to the parking position of the task execution body, the second logistics devices whose distances from the parking position at the arrival time are less than or equal to a distance threshold from all the second logistics devices as the candidate second logistics devices; and the collaborative charging apparatus controls the target second logistics device to move to the parking position so as to meet the task execution body.

Optionally, the collaborative charging apparatus, before controlling the target second logistics device to move to the parking position so as to meet the task execution body after receiving the charging request, plans a path for the target second logistics device in accordance with the parking position to determine a path trajectory; and the collaborative charging apparatus controls the target second logistics device to move to the parking position along the path trajectory so as to meet the task execution body.

Optionally, contactless charging is adopted between the task execution body and the target second logistics device.

Optionally, the first logistics device and/or the target second logistics device is: an unmanned vehicle or drone for logistics delivery.

According to a fourth aspect of the embodiment of the disclosure, a collaborative charging electronic device is provided, the electronic device comprising:

one or more processors;

a memory for storing one or more programs, the one or more programs, when executed by the one or more processors, causing the one or more processors to implement the method provided by the first aspect of the embodiment of the disclosure.

According to a fifth aspect of the embodiment of the disclosure, a computer-readable medium, on which a computer program is stored, is provided, wherein the program, when executed by a processor, implements the method provided by the first aspect of the embodiment of the disclosure.

Figure 4:
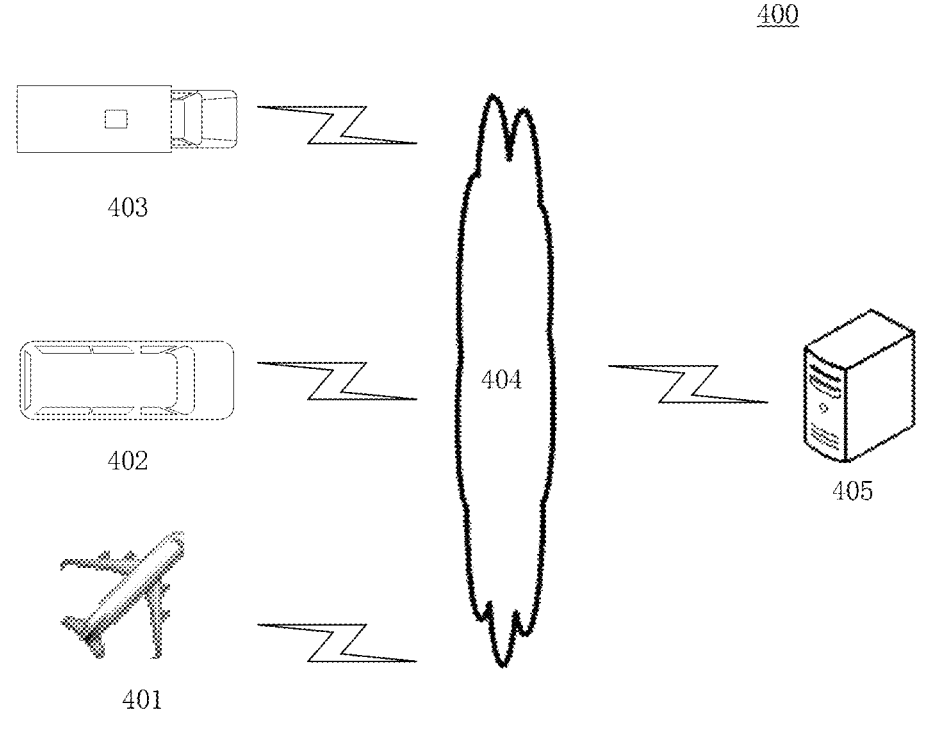
FIG. 4 is an exemplary diagram of a system architecture to which an embodiment of the disclosure can be applied.

FIG. 4 shows an exemplary system architecture 400 to which a collaborative charging method or a collaborative charging apparatus according to an embodiment of the disclosure can be applied.

As shown in FIG. 4, the system architecture 400 may comprise logistics devices 401, 402, 403, a network 404, and a server 405. The network 404 is a medium for providing a communication link between the logistics devices 401, 402, 403 and the server 405. The network 404 may include various connection types, such as wired or wireless communication links, or fiber-optic cables.

The user may use the logistics devices 401, 402, 403 to interact with the server 405 through the network 404 to receive or transmit messages and so on. Various communication client applications, such as map navigation applications, web browser applications, search applications, instant messaging tools, email clients, social platform software, and so on (only examples), may be installed on the logistics devices 401, 402, 403.

The logistics devices 401, 402, 403 may be various electronic devices having screens and supporting web browsing, including but not limited to motor vans, vans, unmanned vehicles, unmanned or manned planes, and so on.

The server 405 may be a server that provides various services, such as a background management server that provides support for map navigation applications browsed by the user using the logistics devices 401, 402, 403 (only an example). The background management server may process, for example, analyze the received charging request transmitted by the logistics device to be charged and other data, and feed the processing results (such as the target second logistics device—only an example) back to the terminal devices.

It shall be noted that the collaborative charging method provided by the embodiment of the disclosure is generally performed by the server 405, and correspondingly, the collaborative charging apparatus is generally provided in the server 405.

It should be understood that the numbers of the terminal devices, the networks, and the servers in FIG. 4 are merely schematic. According to implementation requirements, there may be any numbers of terminal devices, networks, and servers.

Figure 5:
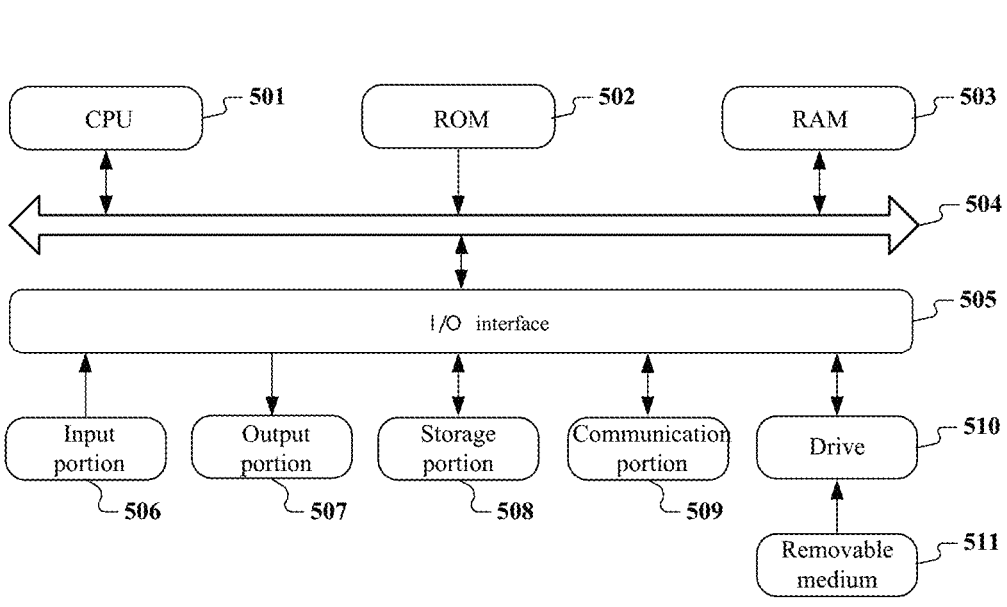
FIG. 5 is a schematic diagram of a structure of a computer system suitable for implementing a terminal device or a server according to an embodiment of the disclosure.

Reference is now made to FIG. 5, which shows a schematic diagram of a structure of a computer system 500 suitable for implementing a terminal device according to an embodiment of the disclosure. The terminal device shown in FIG. 5 is only an example, and shall not impose any limitation on the functions and the scope of use of the embodiment of the disclosure.

As shown in FIG. 5, the computer system 500 includes a central processing unit (CPU) 501, which may perform various appropriate actions and processes according to a program stored in a read-only memory (ROM) 502 or a program loaded from a storage portion 508 into a random access memory (RAM) 503. Various programs and data required for the operation of the system 500 are also stored in the RAM 503. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse, and so on; an output portion 507 including a cathode ray tube (CRT), a liquid crystal display (LCD) and so on, and a speaker and so on; a storage portion 508 including a hard disk and so on; and a communication portion 509 including a network interface card such as a LAN card, a modem, and so on. The communication portion 509 performs communication processing via a network such as the Internet. A drive 510 is also connected to the I/O interface 505 according to requirements. A removable medium 511, such as a magnetic disk, an optical disk, a magneto-optical disk, a semiconductor memory, and so on, is installed on the drive 510 according to requirements so that a computer program read therefrom is installed in the storage portion 508 according to requirements.

In particular, according to the embodiment disclosed in the disclosure, the process described above with reference to the flowchart may be implemented as a computer software program. For example, the embodiment of the disclosure includes a computer program product, which includes a computer program carried on a computer-readable medium, the computer program containing a program code for performing the method shown in the flowchart. In such embodiment, the computer program may be downloaded and installed from the network through the communication portion 509, and/or installed from the removable medium 511. When the computer program is executed by the central processing unit (CPU) 501, the above functions defined in the system according to the disclosure are executed.

It shall be noted that the computer-readable medium shown in the disclosure may be a computer-readable signal medium or a computer-readable storage medium or any combination of the above two media. The computer-readable storage medium may be, for example, but not limited to, an electronic, magnetic, optical, electromagnetic, infrared, or semiconductor system, apparatus or device, or any combination thereof. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the disclosure, the computer-readable storage medium may be any tangible medium containing or storing a program, and the program may be used by or in combination with an instruction execution system, apparatus or device. In the disclosure, the computer-readable signal medium may include a data signal propagated in a baseband or propagated as a part of a carrier wave, in which a computer-readable program code is carried. Such propagated data signal may adopt many forms, including but not limited to electromagnetic signals, optical signals, or any suitable combination thereof. The computer-readable signal medium may be also any computer-readable medium other than the computer-readable storage medium, and the computer-readable medium may send, propagate, or transmit a program for use by or in combination with the instruction execution system, apparatus or device. The program code contained on the computer-readable medium may be transmitted using any appropriate medium, including but not limited to wireless, wire, optical cable, RF, and so on, or any suitable combination thereof.

The flowcharts and block diagrams in the figures illustrate architectures, functions and operations that may be implemented by systems, methods and computer program products according to various embodiments of the disclosure. In this regard, each block in the flowcharts or block diagrams may represent a module, a program segment, or a part of a code, which contains one or more executable instructions for implementing specified logic functions. It shall be also noted that in some alternative implementations, the functions labeled in the blocks may also occur in an order different from that labeled in the figures. For example, two successively represented blocks may actually be executed substantially in parallel, and they may sometimes be executed in a reverse order, which depends on the functions involved. It shall be also noted that each block in the block diagrams or flowcharts, and combinations of the blocks in the block diagrams or flowcharts may be implemented with a dedicated hardware-based system that performs specified functions or operations, or may be implemented with a combination of dedicated hardware and computer instructions.

The involved modules described in the embodiment of the disclosure may be implemented by software or hardware. The described modules may be also provided in a processor. For example, a description may be made as follows: a processor comprising: a judging module for judging whether remaining battery power of a first logistics device satisfies a preset charging condition; a determining module for determining a target second logistics device for charging the first logistics device when the remaining battery power of the first logistics device satisfies the preset charging condition; and a charging module for controlling the target second logistics device to move to meet the first logistics device so as to charge the first logistics device. The names of these modules do not form limitations of the modules themselves in some cases. For example, the judging module may be also described as a "module for controlling the target second logistics device to move to meet the first logistics device so as to charge the first logistics device".

As another aspect, the disclosure also provides a computer-readable medium, which may be included in the devices described in the above embodiment, or may exist independently without being assembled into the devices. The above computer-readable medium carries one or more programs, and the one or more programs, when executed by one of the devices, cause the device to include: judging whether remaining battery power of a first logistics device satisfies a preset charging condition; if so, determining a target second logistics device for charging the first logistics device; and controlling the target second logistics device to move to meet the first logistics device so as to charge the first logistics device.

According to the technical solution of the embodiment of the disclosure, collaborative charging between respective logistics devices can avoid problems such as low charging efficiency and energy waste caused by necessity of returning to a charging station for charging.

The above specific implementation modes do not form limitations on the scope of protection of the disclosure. It shall be understood by those skilled in the art that various modifications, combinations, sub-combinations and substitutions may occur depending on design requirements and other factors. Any modification, equivalent replacement, improvement, and so on made within the spirit and principle of the disclosure shall be included in the scope of protection of the disclosure.

The invention claimed is:

1. A collaborative charging method, the method comprising:
    judging whether remaining battery power of a first logistics device satisfies a preset charging condition;
    if so, determining a target second logistics device for charging the first logistics device, the first logistics device and a second logistics device both being logistics devices for executing a logistics delivery task; and
    controlling the target second logistics device to move to meet the first logistics device so as to charge the first logistics device.

2. The method of claim 1, wherein the preset charging condition comprises:
    the remaining battery power of the first logistics device being less than battery power required by the first logistics device to arrive at a charging station; or
    a time difference between a delivery time and a scheduled delivery time of a next delivery site being less than or equal to a time difference threshold, the delivery time referring to a time when the first logistics device arrives at the next delivery site after it arrives at the charging station for charging and after it is fully charged.

3. The method of claim 1, wherein determining a target second logistics device for charging the first logistics device comprises:
    determining a waiting time required by each second logistics device in a plurality of candidate second logistics devices to meet the first logistics device and a charging time required thereby for charging the first logistics device;
    determining, in accordance with the waiting time and charging time corresponding to each candidate second logistics device, a total charging time corresponding to the candidate second logistics device; and
    using the candidate second logistics device with the shortest total charging time as the target second logistics device for charging the first logistics device.

4. The method of claim 3, wherein before determining a waiting time required by each second logistics device in a plurality of candidate second logistics devices to meet the first logistics device and a charging time required thereby for charging the first logistics device, the method further comprises: selecting, in accordance with a parking position and an arrival time to the parking position of the first logistics device, the second logistics devices whose distances from the parking position at the arrival time are less than or equal to a distance threshold from all the second logistics devices as the candidate second logistics devices; and
    controlling the target second logistics device to move to meet the first logistics device comprises: controlling the target second logistics device to move to the parking position so as to meet the first logistics device.

5. The method of claim 4, wherein before controlling the target second logistics device to move to the parking position so as to meet the first logistics device, the method further comprises: planning a path for the target second logistics device in accordance with the parking position to determine a path trajectory; and
    controlling the target second logistics device to move to the parking position so as to meet the first logistics device comprises: controlling the target second logistics device to move to the parking position along the path trajectory so as to meet the first logistics device.

6. The method of claim 1, wherein before judging whether remaining battery power of a first logistics device satisfies a preset charging condition, the method further comprises: confirming receipt of a charging request from the first logistics device;
    wherein the charging request is made when a battery life of the first logistics device is less than a remaining driving time duration of the first logistics device; the remaining driving time duration of the first logistics device refers to a time duration required by the first logistics device to arrive at a next delivery site.

7. The method of claim 1, wherein contactless charging is adopted between the first logistics device and the target second logistics device.

8. The method of claim 1, wherein the first logistics device and/or the target second logistics device is: an unmanned vehicle or drone for logistics delivery.

9. A collaborative charging apparatus, the apparatus comprising:
    a processor, the processor configured to:
        judge whether remaining battery power of a first logistics device satisfies a preset charging condition;

determine a target second logistics device for charging the first logistics device when the remaining battery power of the first logistics device satisfies the preset charging condition, the first logistics device and a second logistics device both being logistics devices for executing a logistics delivery task; and control the target second logistics device to move to meet the first logistics device so as to charge the first logistics device.

10. A collaborative charging logistics device, the device comprising:

a task execution body for executing a logistics delivery task and moving to meet a logistics device to be charged to charge the logistics device to be charged when receiving a control command of a collaborative charging apparatus;

a detecting module for judging whether a battery life of the task execution body is less than a remaining driving time duration of the task execution body; the remaining driving time duration of the task execution body referring to a time duration required by the task execution body to arrive at a next delivery site; and an alarming module for transmitting a charging request when the battery life of the task execution body is less than the remaining driving time duration of the task execution body, so that the collaborative charging apparatus judges whether the remaining battery power of the task execution body satisfies a preset charging condition after receiving the charging request, and determining a target second logistics device for charging the task execution body when judging that the remaining battery power of the task execution body satisfies the preset charging condition and controlling the target second logistics device to move to meet the task execution body so as to charge the task execution body, the task execution body and a second logistics device both being logistics devices for executing a logistics delivery task.

11. A collaborative charging electronic device, comprising:

one or more processors;

a memory for storing one or more programs, the one or more programs, when executed by the one or more processors, causing the one or more processors to implement the method according to claim 1.

12. A non-transitory computer-readable storage medium, on which a computer program is stored, wherein the program, when executed by a processor, implements the method according to claim 1.

* * * * *